March 27, 1928.  1,663,863

P. H. ROYSTER ET AL
PROCESS FOR SEPARATING VARIOUS CONSTITUENTS FROM MIXED MATERIALS AND APPARATUS FOR ACCOMPLISHING SAID SEPARATION
Filed Nov. 28, 1924  2 Sheets-Sheet 1

Inventors
Percy Hoke Royster
William H. Odell

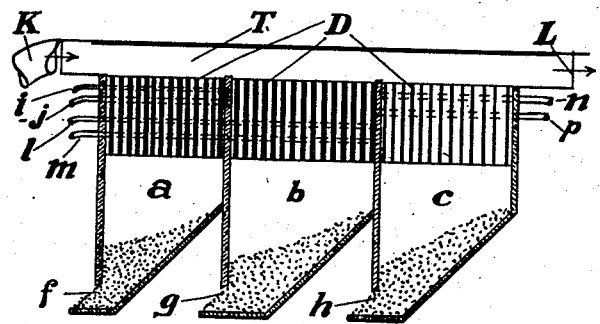
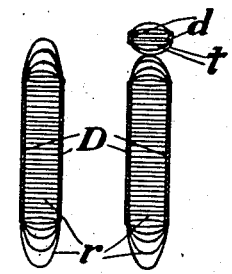
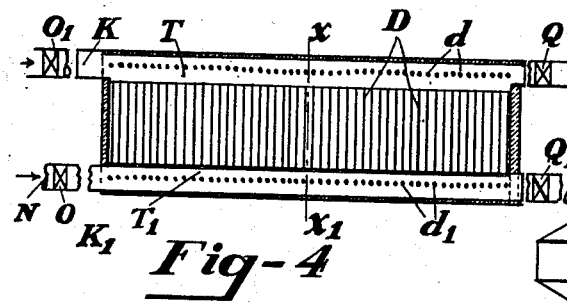
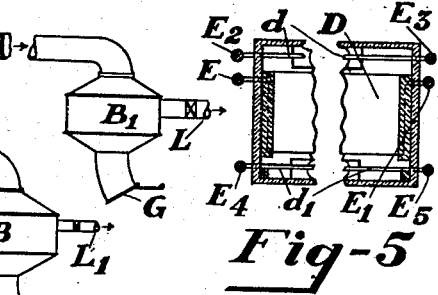
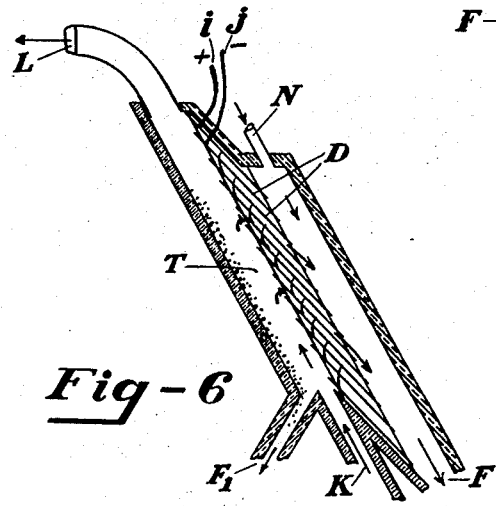
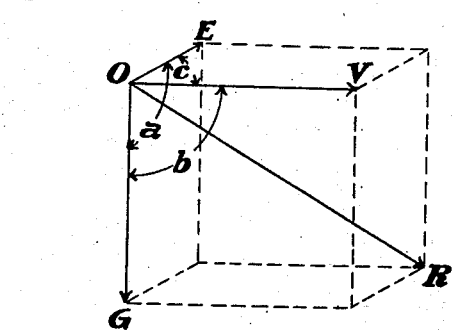

Patented Mar. 27, 1928.

UNITED STATES PATENT OFFICE.

PERCY HOKE ROYSTER AND WILLIAM W. ODELL, OF MINNEAPOLIS, MINNESOTA.

PROCESS FOR SEPARATING VARIOUS CONSTITUENTS FROM MIXED MATERIALS AND APPARATUS FOR ACCOMPLISHING SAID SEPARATION.

Application filed November 28, 1924. Serial No. 752,639.

This invention relates to a means for separating mixtures of materials substantially into their component parts when in a suitable state of subdivision and suspended in a fluid stream, by virtue of the difference in the specific inductive capacity, or dielectric constants, of said materials, the separation being accomplished by maintaining an electrostatic field of force in a portion of said fluid stream.

In every process for separating subdivided materials substantially into component parts, liquids or solids, it is necessary that a force different in magnitude or direction act upon the different constituents of the mixture. In our process this necessary force is effected by the vector addition of gravitational force, electrical attraction, and the force due to stream velocity. This resultant force tends to drag those particles of the mixture having the greatest dielectric constant from the weaker to the stronger regions of the electric field of force more rapidly than those particles having a lower dielectric constant.

This utilization of the natural difference in the specific inductive capacity of materials for separating them from each other is the fundamental basis of our invention and constitutes we believe, a new, novel and useful process. In order to separate different varieties of mixed materials into their respective components we have found that it is necessary to select appropriate values for the following variables: the nature, temperature, pressure, and velocity of the fluid constituting the stream, the shape of the chamber through which the stream flows, the direction of the lines of flow, the size and concentration of the particles carried in the fluid stream, the shape, number and location of the electrodes used to maintain the electrical field of force, the nature of the electrical energy applied to the electrodes—direct current, alternating current or impulsive current—the frequency, and voltage of the electrical potential, and the temperature of the particles.

The objects of this invention are:

(1) To afford a cheap means of separating complex mixtures such as: coal from ash, ore from gangue, mica from clay, silica from limestone, carbon from smoke and fume, etc.

(2) To afford a means for separating globules of liquids not mutually soluble, such as petroleum from water-petroleum emulsion, tar from tar-water emulsion, and the like.

(3) To afford a means of separating liquid globules suspended in a gaseous fluid.

(4) To afford a means of separating complex mixtures into their several constituents.

(5) To electrically separate mixtures of materials into components even when their dielectric constants are substantially alike, by altering the apparent dielectric constant of one or more of said components.

In the present practice the separation of mixtures of miscellaneous materials is usually accompanied by an excessive expenditure of energy, time and materials. We have found that an efficient means of accomplishing separation is afforded by the utilization of the natural differences in the dielectric constants of most materials. For most minerals the dielectric constant ranges from 2.0 to 12 under a continuous electromotive force; however, when they are subjected to a high frequency potential the dielectric constant often changes considerably which affords a means of increasing the effectiveness of an electrostatic field of force as a separating agent.

The commonly employed methods of separating materials from mixtures is based upon, the difference in the density of the various constituents, magnetic susceptibility, and surface tension. These methods are not entirely satisfactory because of the similarity in these properties of a large number of commonly occurring mixtures. We find that it is possible to separate the constituents from complex mixtures without any considerable expenditure of energy or materials even if the density, surface tension, and magnetic susceptibility of the constituents are respectively identical. Apparatus for accomplishing such a separation of mixed materials is shown and described as follows:

Figure 3 is a diagrammatic vertical sectional view of a modified form of the separator showing a multiple series of electrodes and collecting chambers.

Figure 4 is a diagrammatic vertical section of another modification of the separator with connections shown in elevation.

Figure 5 is an end section through $x$—$x_1$ of Figure 4 and shows one means for connecting electrodes to bus bars which lead to a suitable source of electrical energy.

Figure 6 is a vertical sectional view—diagrammatic—of another modification of the separator without connections.

Figure 7 is a sectional diagram of the electrodes showing by lines the direction of the force in the electrostatic field surrounding the electrodes.

Figure 8 is a diagram illustrating the vector addition of the three component forces acting upon the particles while in the electrostatic field of force.

Figures 1, 2:
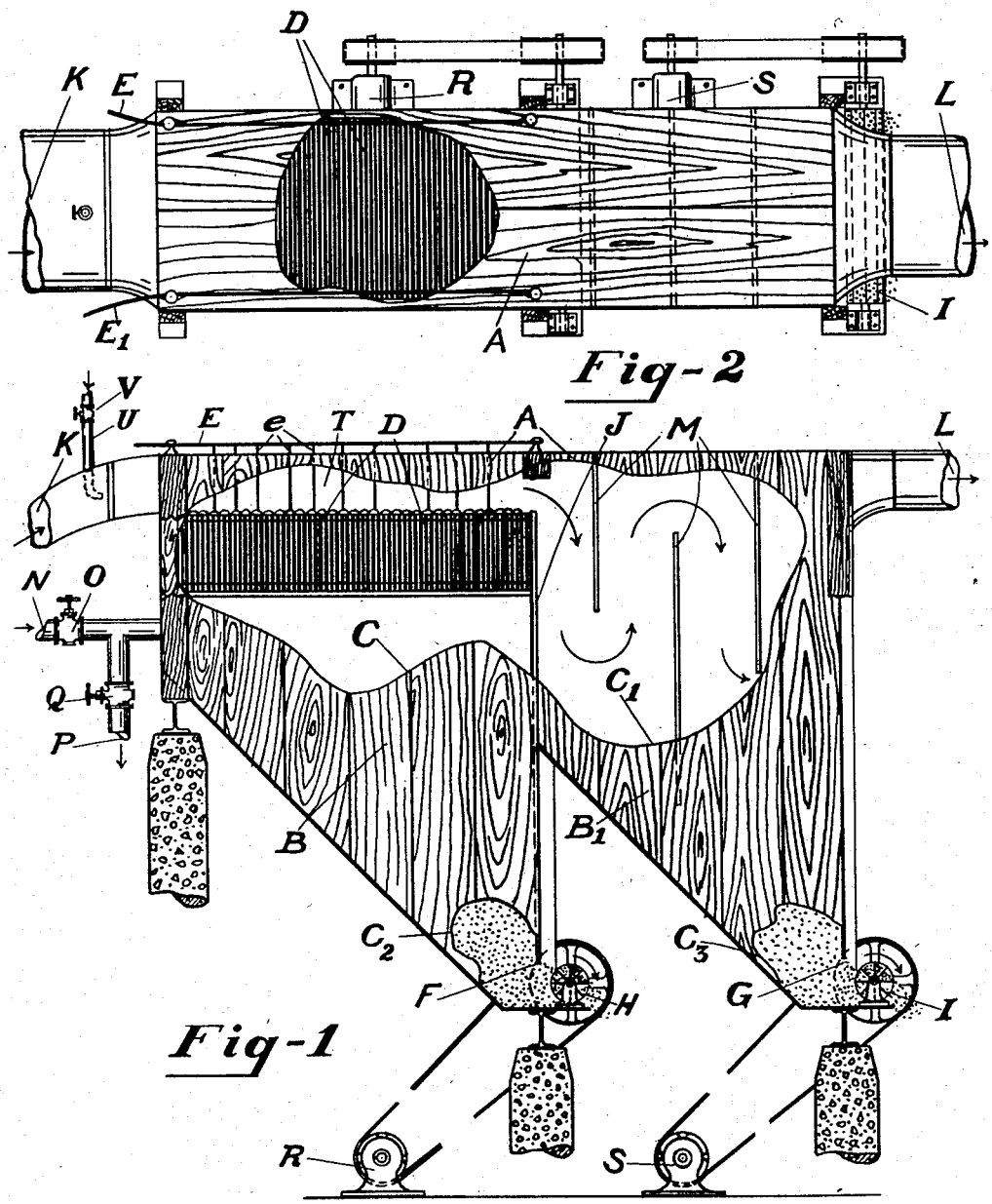
Figure 1 is an elevation of the separator with a portion of the wall cut away to show the interior in section.
Figure 2 is a top view of the separator shown in Figure 1 with a portion of the top cut away to show the location of the electrodes.

In Figure 1, A is the separator shell divided into two portions B and $B_1$ and having portions of the front wall cut away as shown at C, $C_1$, $C_2$ and $C_3$. The spaced primary electrodes, also referred to as plate electrodes, are shown at D. E is a bus bar connecting the alternate primary electrodes to a suitable source of electrical potential, $E_1$ is a bus bar for grounding the other alternate primary electrodes, and $e$ shows the connections of the alternate primary electrodes with the bus bar E. F and G are respectively the openings in chambers B and $B_1$ for the discharge of collected materials. H and I are the rotating paddles which discharge the collected materials respectively through F and G. J is the retaining wall dividing A into the two chambers B and $B_1$. K is the inlet for the primary fluid with a subdivided mixture of materials suspended therein. L is the discharge outlet for the fluid after passing through the chambers. M indicates the baffle plates in settling chamber $B_1$. N is an inlet into the separator for a secondary fluid and O is the control valve for said secondary fluid. P is an auxiliary exit for primary fluid having a control valve Q whereby said primary fluid is caused in part to pass between the electrodes. R and S are motors for driving the discharge paddles. T is a fluid channel through which the primary fluid entering at K passes. U is an inlet for the introduction of a third fluid which has the property of preferentially wetting particles of certain constituents of the mixture suspended in the primary fluid stream, V is the valve controlling the rate of introduction of the latter fluid.

In Figure 3, $a$, $b$ and $c$ are settling or collecting chambers corresponding to B of Figure 1. The discharge openings in these chambers are respectively at $f$, $g$ and $h$ and the conductors connecting the alternate primary electrodes with the ground and with sources of electrical potential are respectively, for the three series of electrodes, $i$ and $j$, $l$ and $m$, and $n$ and $p$.

In Figure 4 substantially the same system of lettering is used although some of the parts are shown in a different form. The electrical connections whereby the primary and secondary electrodes are connected with a suitable source of electrical energy are not shown, for the sake of simplicity. The primary fluid with the suspended materials normally enter the fluid channel T through K, the fluid passing out through $B_1$ and L but it may enter at $K_1$, pass through channel $T_1$ through the spaces between the electrodes D and out through the same discharge ports. In the former instance T is the main fluid channel for the primary fluid and the secondary fluid enters through O into channel $T_1$ and the secondary electrodes normally used are those at $d_1$ only. The electrically separated particles pass out through B and F. Q and $Q_1$ are valves in the discharge lines the adjustment of which controls the quantity of the primary fluid which passes through the spaces between the primary electrodes, or the quantity of secondary fluid which passes in the opposite direction through the spaces between the primary electrodes. When the primary fluid enters through inlet $K_1$ it may be discharged through $B_1$ and L and the electrically separated particles collected in B or the primary fluid may be discharged through B and the electrically separated particles collected in $B_1$. The latter method of operating is not preferable because the electrical force is working directly opposite to the force of gravity. In so operating the secondary fluid is admitted through $O_1$ and becomes the carrying fluid for the electrically separated particles.

In Figure 5 the same system of lettering is used. E and $E_1$ are bus bars whereby the primary electrodes are so connected to a suitable source of electrical energy that an electrical field of force can be created between, and adjacent to, the primary electrodes. For example E connects the alternate primary electrodes to a suitable source of electrical potential and $E_1$ connects the other alternate primary electrodes to the ground. Similarly $E_2$ and $E_3$ are the bus bars connecting the upper secondary electrodes to a suitable source of electrical energy, and $E_4$ and $E_5$ are the bus bars connecting the lower secondary electrodes to a suitable source of electrical energy.

In Figure 6 the letters used refer to substantially the same parts as in the previous figures. $F_1$ is a discharge opening for heavy or large particles separating from the fluid stream by the force of gravity, and $i$ and $j$ are the electrical connecting wires suitably connected to a source of electrical energy whereby an electrostatic field of force can be created between and adjacent to the primary electrodes shown at D.

In Figure 7 the direction and intensity of the electrostatic forces are shown diagramatically by lines; the lines of force due to the charge upon the primary electrodes D are represented by the lines $r$ and the lines of force due to the charge upon the secondary electrodes $d$ are represented by the lines $t$. It will be noted that as the relative intensity of the electric charge upon the respective series of electrodes D and $d$ is changed the lines representing these forces will take different positions with respect to each other in the non-uniform portion of the fields of force.

In Figure 8 the letters used do not relate to the same parts as in the other figures. The line OG represents in direction and magnitude the force of gravity; the line OV represents in direction and magnitude the force due to the fluid stream; the line OE designates similarly the force due to the electrostatic field and the line OR designates the direction and magnitude of the resultant force acting upon the dielectric particles. The letters $a$, $b$ and $c$ denote respectively the angles between the lines of direction of the coacting forces, or, the angles between the vector lines OG—OE, OG—OV and OE—OV.

In order to describe one method of accomplishing the purpose of our invention, the process of separating an ore from its gangue is used as an illustration, as follows:

The crude material is crushed when necessary to a degree of fineness sufficient to break apart, to a great extent, the bond between the ore particles and the gangue particles. The resulting more or less finely ground material is introduced by any device that is convenient, into a fluid stream, which latter is propelled by a suitable fan, blower, compressor or the like, through the separator shown in Figure 1. The fluid used may be air, steam, gas or other suitable medium. The particles of mineral are carried along with the fluid stream into the separator through the inlet port K. The velocity of this fluid stream is usually so adjusted that when the primary electrodes D are not charged substantially all of the crude mineral particles are swept over them through channel T and settle in the secondary chamber $B_1$; the baffles M in chamber $B_1$ promote the settling of the particles in this chamber. The fluid leaves the separator through the port L. The separation is effected by causing a difference in electrical potential to exist between adjacent primary electrodes D; this difference in potential being most easily created by electrically connecting the odd electrodes, 1, 3, 5, 7, etc., to the ground and by electrically connecting the even numbered electrodes, 2, 4, 6, 8 etc., to sources of electrical potential, such as batteries, direct current generators, alternating current transformers or high frequency oscillating circuits. The electrodes D are suitably charged for the requirements of this process when they create in the spaces between the electrodes a very intense and quite uniform electrostatic field of force and when they create a non-uniform electrostatic field of force in the fluid channel adjacent to them. There are a number of forms which these electrodes may assume and prove satisfactory but we prefer to use the plane substantially parallel plate electrodes shown in the drawing. The surfaces of these electrodes should be as smooth as possible and the corners should be well rounded in order that an intense electrostatic field may be maintained about them without causing a so called glow, brush or silent discharge of electricity to take place into the medium surrounding them. The voltage impressed upon the alternate electrodes must be something less than 20,000 volts for each inch of distance between them under usual conditions or sparking between the electrodes will take place. The distance between the individual electrodes may be varied, and the impressed voltage permissible will depend upon the spacing of these electrodes. With finely ground ore the plates may be one quarter of an inch apart, in which case the voltage required to maintain an intense electrostatic field will be relatively low. For larger sizes of material and for large capacity per unit of time, a very high voltage is desired, with the plates spaced one inch or more apart. The separator is most economically built of wood, and unless the materials are unduly moist, the wooden sides of the separator prove adequate as electrical insulation for the electrodes but other electrical insulating materials may be used to replace wood.

When the particle-laden fluid stream enters the separator through the port K, and passes horizontally across the top of the electrodes D, the force of gravity acting downwardly upon each of the suspended particles causes the individual particles to move in a parabolic path curved downwardly. The velocity of the fluid stream is so regulated that few if any of the particles fall into the spaces between the electrodes when the electrodes are not electrically charged. When the electrodes are charged a non-uniform electrostatic field of force exists in the fluid channel above the electrodes, the force being weak at the upper part of the fluid channel, and intense at the lower portion of this channel namely just at the top of the row of electrodes. There is a force therefore acting upon the particles in the fluid channel due to this nonuniform electrostatic field, acting in the direction of the weak to the intense portions of the field, i. e. in this case, downwardly. The influence of this force upon the suspended particles, due to the electrostatic field, depends upon the specific inductive capacity of the materials constituting the various particles, being greater for those particles having a high specific inductive capacity, or dielectric constant, and less for those having a low inductive capacity. The inductive capacity, or dielectric constant, of the ether is usually considered unity; the dielectric constants for most gases is less than one per cent greater than unity. For most nonconducting solids, usually termed "dielectrics," the value of the dielectric constant "$k$" is as great as 2.0 and may be 10.0, and for a few solids, such as mica, is quite high. The dielectric constant for limestone is about 9 and for silica is about 5. In the case of the ore and gangue mixture being considered in this description, the dielectric constants of the ore material and of the gangue material differ one from the other. If the constant "$k$" for the ore be greater than the "$k$" for the gangue, the force due to the electrostatic field will act more strongly upon the ore particles than it will upon the gangue particles causing the ore particles to be deflected downwardly more strongly than the gangue particles. The intensity of the electrostatic field is increased and the velocity of the fluid stream is reduced until a portion of the suspended particles are withdrawn from the fluid stream in the channel above the electrodes and are attracted into the spaces between the electrodes. The electrostatic field in these spaces being substantially uniform no force due to the electric field acts upon the particles in this space and the particles fall through these spaces by force of gravity and collect in the bottom of the primary chamber B, from which they are removed by the rotating paddle H, driven by the motor R.

The particles of gangue material in the fluid channel above the electrodes D are also attracted downwardly by the electrostatic field, but because the dielectric constant of the gangue is less than that of the ore the attractive force of the electrostatic field is less, and the gangue particles are swept past the electrodes and into the secondary settling chamber $B_1$ where the low velocity of the fluid stream allows the particles to settle from the fluid stream because of surface contact and the force of gravity. The gangue particles collecting in the secondary chamber $B_1$ are removed by means of the rotating paddle I driven by the motor S. It is convenient to leave a sufficient amount of the collected material in the bottom of both chambers, B and $B_1$, to seal the openings F and G and to prevent excessive leakage of the fluid or of the particles.

It is obvious that for those cases in which the dielectric constant "$k$" of the ore is less than that of the gangue the particles of gangue will collect in the primary chamber B and the ore in the secondary chamber $B_1$.

We realize of course that this process of separating mixtures of materials into components is of very general application, and may be utilized for effecting a separation wherever the dielectric constants of the materials composing the mixture are appreciably different one from the other.

The separator shown in Figure 3 is a modification of the apparatus shown in Figures 1 and 2. In this separator there are three settling chambers, $a$, $b$, and $c$ and three sets of primary electrodes. The potential gradient between the electrodes of these three sets may be the same or may be different for each set. We find that it is sometimes desirable to have a weak electrostatic field in chamber $a$ and a stronger field in chamber $b$ and a still more intense field in the final chamber $c$. When this separator is operated as described above, the crude material introduced into the fluid stream which enters the separator through the inlet port K will be converted into three portions. The portion collecting in the primary settling chamber $a$, by the selective attraction of the relatively weak electrostatic field maintained in the fluid channel T above the primary electrodes, and called for convenience the "electrostatic heads", is composed of those particles having the highest dielectric constant "$k$"; the portion diverted from the fluid stream in the final chamber $c$ in which the strongest electrostatic field is maintained, is composed of those particles having a relatively low dielectric constant, and will be termed the "electrostatic tailings". The intermediate chamber $b$ in which an electrostatic field of intermediate strength is maintained, collects those particles having a dielectric constant intermediate that of the "heads" and of the "tails"; this portion is termed the "electrostatic middlings". It is often necessary in effecting the separation of mixtures to produce electrostatic middlings which after removal from the apparatus may be run through the separator a second time to improve the cleanness of the separation.

From the above description it will be seen that the separation of mixtures into their components is effected in this process by virtue of the difference in the magnitude of the force exerted by a non-uniform electrostatic field upon various particles having different dielectric constants.

The particles in the fluid channel T of the separator as shown in Figures 1, 2 and 3, are acted upon by a resultant force due to the vector addition of three component forces. The three forces are: gravitational force, the force due to fluid motion and the force due to the electrostatic field. In the two forms of separators described above and illustrated in Figures 1, 2 and 3 the force of gravity and the electric force act in the same direction and the force due to the fluid motion acts at right angles to them. It is not necessary to this process that these three component forces act in these directions. Referring to Figure 8, the angles $a$, $b$ and $c$ may have any value between zero and 360 degrees of arc. In the apparatus shown in Figures 1, 2 and 3 the angles had the following values: $a=0$ degrees, $b=90$ degrees and $c=90$ degrees.

In order to illustrate how our process may be carried out in an aparatus in which the angles $a$, $b$ and $c$—Figure 8—have values other than these, the modification shown in Figure 6 may be used as an example. In this apparatus the particle-laden fluid enters the port K and flows in an upward direction through the fluid channel T, the fluid and a part of the originally suspended particles leave the separator at the upper port L. The electrodes maintaining the electrostatic field are shown at D. The largest and heaviest particles introduced with the fluid stream fall against the lower left hand wall of the fluid chamber and roll down this wall and are removed from the separator through the port $F_1$. The particles having a relatively high dielectric constant, which are diverted from the fluid stream into the spaces between the electrodes, fall at a downward angle along the upper surfaces of the electrodes and are removed through the port F. In this apparatus the three angles defined above and shown in Figure 8 have the following approximate values: $a=45$ degrees, $b=150$ degrees and $c=165$ degrees. In general it is possible to construct a satisfactory separator using almost any values for the three angles $a$, $b$ and $c$, provided the strength of the electrostatic field and the velocity of the fluid stream are maintained at suitable values in relation to each other and to the structure of the apparatus.

It will be noted that the cost of maintaining the fluid stream carrying the particles of material in suspension is an important element in the economy of the process, and in applying the principle of this invention, the velocity of the stream should be kept at a minimum. This is best accomplished by making the angle $b$ between the force components OG and OV of Figure 8 small or even zero; that is by making the axis of the fluid channel vertical and causing the particle-laden stream to move downwardly through it, so that the force due to the fluid motion acts in the direction of the force of gravity. When the separator is constructed in this manner the quantity of fluid required to transport a given weight of a mixture of materials is at a minimum. The velocity of the fluid stream is controlled in such a way that the particles move through the electrostatic field at a velocity suitable for the effective separation of the components of the mixture. In some instances the required velocity of the fluid stream is zero, that is, the fluid in the fluid channel is at rest and the particles of materials fall through the channel and the fluid under the influence of gravity, being retarded in their motion by the resistance of the stationary fluid. This, however, is merely a particular case in which the velocity of the fluid stream has the value zero.

Our method of separating mixtures of materials is applicable to such a variety of materials, and the uses to which the materials when separated may be put are so varied, that it is impossible to describe the details of every possible application of the principle which we believe we have discovered and which is described herein. It should be understood that the process of separating an ore from its gangue, as described above, by means of the apparatus illustrated in Figures 1, 2 and 3, is merely an illustration of a single application of this invention. The mixture to be separated may consist of two liquids not mutually soluble. In this case if the mixed liquids are sprayed into the primary fluid stream in the form of drops, globules, droplets, mist, fog or the like, the globules of liquid thus suspended are "particles of materials" in the sense in which the latter term is used in this application. The fluid stream used to carry the particles is air in most cases but in some instances, such as when the mixture to be separated has been subjected to some metallurgical process, the fluid stream may conveniently be producer gas, blast furnace gas or other fluid.

Most of the natural or artificial mixtures, from which it is industrially important to separate one or more of the several constituents, are composed of components having dielectric constants appreciably different from each other. There are cases, however, where the difference between the dielectric constants of the components to be separated is so small that economical separation is difficult. We have found two special methods of procedure to be useful and successful in such cases. It is usually true, so far as we are aware, that the dielectric constant of a given substance is a function of the frequency of alternations of the polarity of the electrostatic field in which the substance is placed. When it is difficult or impossible to separate two components of a mixture having nearly identical dielectric constants by passing the particles of the mixture suspended in a fluid stream through a nonuniform electrostatic field maintained by electrodes connected to a source of direct current or to a source of alternating current of say, 25, 60 or 500 cycles per second, it is possible, we have found, to effect the required separation by connecting the electrodes to an electrically oscillating current of say 300,000 cycles or 3,000,000 cycles. The parallel plate electrodes of the separator shown in Figure 1, when connected as described, form an air condenser. This condenser may be connected in the usual fashion with an inductance and a spark gap, electric arc, thermionic valve, or high frequency alternator in such a manner that a current of high frequency will flow through the circuit and cause the polarity of the non-uniform electrostatic field in the fluid channel T to alternate at this high frequency, in accordance with the capacity of the condenser formed by the parallel plate electrodes D and the inductance of the circuit connected thereto. The particles of each component of the mixture suspended in the fluid channel will have a dielectric constant different from the dielectric constant exhibited by the same particles in continuous or slowly alternating electrostatic fields. The dielectric constant of some substances increases with the frequency of the alternating field, whereas with other substances it decreases. In general it is possible to select a frequency of alternations at which the components to be separated differ by the greatest amount or optimum amount.

This required difference between the dielectric constants of the components to be separated may be effected by a second procedure. As a specific example, warm oil vapor may be introduced through the auxiliary pipe U, Figure 1, into the fluid stream carrying in suspension powdered coal of high ash content. The temperature of the air stream is controlled in such a manner that the oil vapor condenses in the fluid channel T, the oil forming a film on the surface of the particles of coal substance, not appreciably condensing upon or adhering to the surface of the ash. The various particles of coal substance thereby become covered with a liquid layer of oil having a high dielectric constant, and the electrostatic field will act differently upon the particles of coal substance so wetted than upon the coal particles not so wetted; and the relative values of the dielectric constants of the ash and coal particles will thereby be altered. The selection of oil vapor, of an air stream and of coal and ash particles in this case is merely an example used for the sake of clearness. There are a number of suitable gaseous substances, or condensable vapors, or liquids which may be introduced into the fluid stream, which have the property of forming a surface liquid film upon the particles of one component to a greater extent than upon the particles of another component of a suspended mixture of materials with the result that the particles with their adhering surface film of liquid will be acted upon with a different intensity by the electrostatic field.

The two methods of procedure described above, for altering the dielectric constants of the particles, are pointed out not because they involve an extension of the principle of the invention but because they might otherwise be considered a separate feature patentable as such. The principle of this invention relates to the separation of suspended particles of mixed materials acted upon simultaneously by gravity, by a fluid stream and by an electrostatic field; the separation is effected because of the difference in the effect of this field upon "particles" having different dielectric constants whether the particles naturally have different dielectric constants, whether one or more adhering liquid films give them artifically such different constants, or whether this difference is because of the selection of a particular frequency of alternation of the polarity of the electrostatic field.

It is of course not always possible with our process to effect a perfect separation of even two components of a binary mixture, no matter how great the difference between the dielectric constants of these components. Some of component A may remain in component B and some of B may be retained in component A. It is not practically desirable to carry the separation to an extreme approach to completion. We have found that the use of a secondary fluid stream passing between the electrodes enables the operator to control the tonnage and degree of purity of a separated component. Referring to Figure 1 and returning to the example of the mixture of ore particles and gangue particles, two cases of importance are met with in practice. The use to which the ore, when separated, is to be put may require that a high degree of purity of the ore component separated be attained, while an appreciable loss of ore carried away with the gangue may be allowable. It is assumed that air is the fluid used for carrying the crude mixture in suspension and that the dielectric constant of the ore is higher than that of the gangue material. In this case the secondary inlet N is connected with an air line in which the pressure is higher than the pressure in the fluid channel T. The valve O is opened sufficiently to maintain a higher pressure in the chamber B than in channel T. This causes the air in the spaces between the electrodes D to pass upwardly into channel T, or expressed differently; the secondary fluid, air in this case, passes through the electrode spaces counter to the path of the electrically diverted particles therein. The effect of the secondary air is to retard those particles that are being drawn into these spaces between the electrodes, with the result that only those ore particles of the greatest purity and having the greatest dielectric constant will be diverted from the air stream in channel T and be drawn into the spaces between the electrodes D. The amount of air flowing between the plates will usually be small compared with the amount of air flowing through the channel T.

In those cases in which the ore substance has a lower dielectric constant than its accompanying gangue the valve O is closed and valve Q is opened so that the pressure in channel T is higher than the pressure in chamber B and some of the fluid from channel T flows downwardly between the electrodes D into chamber B and out through valve Q and outlet P. A portion of the primary air stream in this case causes a force to act upon the particles in substantially the same direction as the force of gravity, and the force of the electrostatic field. Particles of ore of low purity i. e. particles containing a considerable amount of the high dielectric gangue will be swept into the spaces between the electrodes D and only those particles of relatively low dielectric constant, containing a high percentage of ore substance will pass by the electrodes, out of the channel T, and be deposited in the secondary chamber $B_1$.

In Figure 4 is shown diagrammatically a separator with which we often prefer to effect a separation of a mixture of materials by our process. The mixture in a suitably fine state of subdivision is introduced into the fluid stream through the primary inlet K, the flow through which may be regulated by adjusting valve $O_1$. The particle-laden fluid stream passes through the fluid channel T and the fluid, with more or less of the particles removed therefrom, leaves the channel through Q and passes through chamber $B_1$. The secondary inlet $K_1$ is connected to a suitable source of supply of secondary fluid having a secondary-fluid inlet valve O and a separate outlet with the outlet valve $Q_1$. Valves O, $O_1$, Q and $Q_1$ are opened by such a predetermined and controlled amount that fluid streams pass through both the lower channel T, and the upper channel $T_1$. The plate electrodes D are connected to a source of electrical potential as described above for the maintenance of a suitable electrostatic field. By varying the opening of the valves O, $O_1$, Q and $Q_1$ it is possible to cause a fluid to flow through the spaces between the plate electrodes D in either direction, i. e. from the channel T to $T_1$ or from $T_1$ to T. The particles of the mixture suspended in the fluid channel T are acted upon by the non-uniform electrostatic field maintained therein and those with the highest dielectric constant are diverted downwardly into the spaces between the electrodes D by the aid of gravitational force and the electrostatic field maintained by the secondary electrodes $d_1$; they are withdrawn from said spaces into the secondary fluid stream in channel $T_1$ and are conducted out, suspended in this stream, through $Q_1$, B and F. The intensity of the charge upon the secondary electrodes $d_1$ may be greater than that on the primary electrodes D. When the secondary electrodes shown at $d_1$, Figure 4, are in use the other set of secondary electrodes shown at $d$ of the same figure are not usually used, and vice versa.

Referring again to Figure 4: When the suspended mixture and the primary fluid are admitted at $K_1$ the electrodes D and $d$ are suitably charged as described, and the electrodes $d_1$ are not charged. The intensity of the charge upon $d$ is preferably greater than that upon D. The secondary fluid now enters at K but usually none of it is allowed to pass downwardly under these conditions of operation for the force of the electrostatic field is not great enough to be effective against gravity and a fluid stream. Some of the primary fluid is allowed to pass upwardly between the electrodes D and join the secondary stream in channel $T_1$ but the larger part of it passes out through $Q_1$. The particles having a high dielectric constant are electrostatically withdrawn from the channel $T_1$ into the spaces between the electrodes D, and from there into channel T by reason of the charge maintained upon electrodes $d$ and are carried out from T suspended in the secondary fluid entering at K and leaving through Q.

It is obvious that other means for discharging the separated portions of a mixture will serve equally as well as the means shown in the figures and we therefore do not limit ourselves to the latter means of discharging. Likewise there are sometimes advantages in establishing the plate electrodes at an angle with respect to each other and, in recognizing this, we do not confine ourselves to the use of parallel plates. We have found that it is sometimes advantageous to make the plate electrodes in two parts connected by insulating material whereby the electrical potential of one part of a plate is higher than that of another part and whereby the electrostatic field adjacent the plates may be substantially continuous adjacent one portion of the electrodes and intermittent adjacent other portions. We are claiming as our own the broad principle herein described and are therefore not building claims around some of the special modifications here alluded to.

We claim:

1. The process of separating complex mixtures of materials substantially into their component parts successively and substantially in the order of the magnitudes of their respective dielectric constants, consisting in, suspending the mixture in a suitably fine state of subdivision in a suitable gaseous stream; conducting the resulting suspension through a non-uniform electrostatic field of force of predetermined and controlled nature and intensity but substantially free from electric discharge at a predetermined and controlled velocity; diverting the several constituents of said mixture separately from the weaker to more intense portions of the electrostatic field by means of the electrostatic force of said field acting with greatest intensity upon the dielectrics having the highest dielectric constants; and separating said separately-diverted constituents substantially as described.

2. The process of separating from complex mixtures those components having dielectric constants of a higher magnitude than the dielectric constants of the other constituents of said mixture, consisting in, conducting the mixture suspended in a suitable fluid stream at a predetermined and controlled velocity through a non-uniform electrostatic field of force of predetermined and controlled nature and intensity but substantially free from electric discharge; causing those components having said relatively high dielectric constants to be acted upon by a greater force due to the electrostatic field, than are the other components of said mixture, and thereby diverted into different channels and separated in a suitable manner substantially as described.

3. The process of separating a mixture of materials into portions composed of materials the dielectric constants of which differ in the different portions, consisting in, conducting the mixture in a suitable state of subdivision, through a non-uniform electrostatic field substantially free from electric discharge; causing the different particles of said mixture to be acted upon differently by said electrostatic field and to move with different velocities and in different directions depending upon and varying with the respective dielectric constants of said particles; and collecting the variously diverted particles in portions having dielectric constants of different magnitudes substantially as described.

4. The process of separating complex mixtures of materials into portions composed of materials the dielectric constants of which differ in the different portions, consisting in, conducting the mixture in a suitable state of subdivision in a downward direction under the force of gravity through a non-uniform electrostatic field substantially free from electric discharge; causing the force exerted by said electrostatic field upon the different initially uncharged dielectric particles of the mixture to move them at different speeds and in different directions depending upon and varying with the dielectric constants of said particles, and collecting the particles in portions having different dielectric constants substantially as described.

5. The process of separating complex mixtures of materials into several portions having different dielectric constants, consisting in, subjecting the mixture in a suitable state of subdivision suspended in a suitable fluid stream to a force resulting from the vector addition of gravity, of the force due to the motion of the fluid, and of the attractive force exerted on initially uncharged dielectrics by a non-uniform electrostatic field substantially free from electric discharge; causing the different particles of said materials having various dielectric constants to move at different speeds and in different directions, and separating them into portions having different dielectric constants, substantially as described.

6. The process of separating complex mixtures of materials into several portions having different dielectric constants, consisting in, subjecting the mixture in a suitable state of subdivision suspended in a suitable fluid stream to a force resulting from the vector addition of gravity, of the force due to the motion of the fluid, and of the attractive force exerted on dielectrics by a non-uniform electrostatic field, substantially free from electric discharge; causing the different particles of said materials having various dielectric constants to move at different speeds and in different directions, and separating them into portions having different dielectric constants, said portions each composed of particles having substantially the same dielectric constant substantially as described.

7. The process of separating from complex mixtures of materials, those components having dielectric constants of a higher magnitude relative to the dielectric constants of the other constituents of said mixture, consisting in, conducting the mixture in a suitably fine state of subdivision suspended in a suitable fluid stream, at a predetermined and controlled velocity through a non-uniform electrostatic field of force of predetermined nature and intensity but substantially free from electric discharge; diverting those components having said relatively high dielectric constants into and through a more uniform electrostatic field of force and subsequently through a second non-uniform electrostatic field of force and into a collecting chamber; conducting the other components consisting of particles having relatively low dielectric constants into a separate collecting chamber substantially as described.

8. The process of separating particular constituents from complex mixtures of materials by virtue of the attracting force of a non-uniform electrostatic field substantially free from electric discharge, consisting in, suspending the mixture in a suitably fine state of subdivision in a suitable fluid stream; introducing into said suspension a condensable gaseous medium; condensing said gaseous medium while in said fluid stream, preferentially upon the particles of that particular constituent which is naturally preferentially wetted by the particular gaseous medium used for the purpose of altering the dielectric constants of said particular particles; conducting the resulting suspension through a non-uniform electrostatic field and simultaneously withdrawing from it, by the attractive force of said non-uniform electrostatic field upon initially uncharged dielectrics, the particles of said suspension having dielectric constants of high magnitude relative to other particles of said mixture; and subsequently collecting the separated portions of said mixture substantially as described.

9. The process of separating particular constituents from complex mixtures of materials by virtue of the attracting force of an electrostatic field for dielectrics, consisting in, suspending the mixture in a suitably fine state of subdivision in a suitable fluid stream; introducing into said suspension a condensable gaseous medium, condensing a portion of said gaseous medium while in said fluid stream preferentially upon the particles of that particular constituent which is naturally preferentially wetted by the particular gaseous medium used for the purpose of altering the dielectric constants of said particular particles; conducting the resulting suspension through a non-uniform electrostatic field substantially free from electric discharge and simultaneously withdrawing from it, by the attractive force of said non-uniform electrostatic field upon dielectrics, the particles of said suspension having dielectric constants of high magnitude relative to other particles of said mixture; and subsequently collecting the separated portions of said mixture substantially as described.

10. The process of separating subdivided complex mixtures of materials electrostatically into portions having different dielectric constants, the particles of any one portion having the same dielectric constant, consisting in, suspending said mixture in a suitable state of subdivision in a suitable fluid stream; conducting said suspension through a non-uniform electrostatic field adjacent the edges of suitable electrified and closely spaced electrodes at a predetermined angle with respect to the planes of said electrodes; diverting from said fluid stream those particles having relatively high dielectric constants with respect to the remaining particles of said mixture by attracting them electrostatically into the stronger electrostatic field existing between said plate electrodes; conducting said diverted particles through a second non-uniform electrostatic field of greater intensity than the first one and into a suitable collecting chamber; conducting that portion of the mixture not diverted between said plate electrodes, into a separate collecting chamber and removing the separately collected portions substantially as described.

11. The process of separating subdivided complex mixtures of materials electrostatically into portions having different dielectric constants, the particles of any one portion having the same dielectric constant, consisting in, suspending said mixture in a suitable state of subdivision in a suitable gaseous stream; conducting said suspension through a non-uniform electrostatic field adjacent the edges of suitably electrified and closely spaced electrodes at a predetermined angle with respect to the planes of said electrodes; diverting from said gaseous stream those particles having relatively high dielectric constants with respect to the remaining particles of said mixture by attracting them electrostatically into the stronger electrostatic field existing between said plate electrodes; conducting said diverted particles through a second non-uniform electrostatic field of greater intensity than the first one and into a suitable collecting chamber and collecting them therein; passing a second gaseous stream of relatively small volume, through the electrostatic field between said plate electrodes counter to the path of said diverted particles simultaneous with the passage of said diverted particles therein, and into the first gaseous stream; conducting that portion of the mixture not diverted between said plate electrodes into a separate collecting chamber and removing the separated materials substantially as described.

12. The process of separating finely divided complex mixtures of materials into portions having different dielectric constants, successively, in the decreasing order of their respective dielectric constants, consisting in, conducting the suitably subdivided mixture suspended in a fluid stream through non-uniform electrostatic fields of force adjacent a multiple series of electrically charged, closely spaced electrodes, having progressively a charge of increasing intensity in the different series from first to the last series; electrostatically diverting the dielectric particles of the mixture from the fluid stream successively into the electrostatic fields between said electrodes in the decreasing order of their dielectric constants and respectively in the increasing order of the intensity of electric charge upon the electrodes in said successive series; collecting the separately diverted particles in suitable separate chambers substantially as described.

13. The process of separating complex mixtures of materials substantially into their several components consecutively, substantially in the order of their specific inducting capacities, consisting in, suspending the mixture when in a suitable state of subdivision, in a suitable fluid stream, and passing the resulting suspension through a non-uniform electrostatic field of controlled and predetermined nature and intensity at a controlled and predetermined velocity; causing the several constituents of said mixture to be diverted separately from the weaker to more intense portions of the electrostatic field according to the dielectric constants of said constituents and substantially in proportion to the relative quantities of materials of different specific inductive capacity present in the original mixture; collecting separately the variously diverted particles substantially as described.

14. The process of separating from complex mixtures of materials those components having dielectric constants of high value relative to the dielectric constants of the remaining components, consisting in, passing the suitably subdivided mixture while suspended in a fluid stream and initially in an electrically uncharged condition, through a non-uniform electrostatic field substantially free from electric discharge but of predetermined nature and intensity, at such a velocity that substantially those components only which have said relatively high dielectric constants are diverted from their path by the attractive force of said electrostatic field and separated from the remaining components substantially as described.

15. In the process of separating one from another the several constituents of complex mixtures of materials by the aid of electrostatic fields of force, the steps consisting in, suspending said mixture, when suitably subdivided, in a fluid stream; conducting the suspension through a fluid channel and through an electrostatic field of force of controlled and predetermined nature and intensity, but substantially free from electric discharge, maintained in a portion of said fluid stream; and causing the suspended particles to separate from each other and to pass into separate channels substantially in the order of the magnitude of their respective dielectric constants, by virtue of the combined effect of gravity, of fluid motion, and of the electrostatic field, substantially as described.

16. In the process of separating mixtures of materials into portions having dielectric constants differing one from another the steps consisting in, passing the mixture, suitably subdivided and suspended in a fluid stream, through a non-uniform electrostatic field substantially free from electric discharge, causing the particles of said mixture having different dielectric constants to be acted upon differently by electrostatic attractive force and thereby separated into different portions, substantially as described.

17. In an apparatus for electrically separating mixtures of finely divided materials into portions having different dielectric constants, electrostatically charged electrodes suitably spaced and placed in a separator with means for electrostatically diverting initially uncharged dielectrics from a suspension of a mixture of materials in a moving fluid, substantially as described.

18. In an apparatus for electrically separating mixtures of finely divided materials into portions having different dielectric constants, a multiplicity of electrically charged electrodes between pairs of which is maintained an electrostatic field substantially free from electric discharge, suitably placed and spaced in a separator for diverting dielectrics from a suspension of a mixture of materials in a fluid stream, substantially as described.

19. In an apparatus for electrostatically separating mixtures of finely divided materials suspended in a fluid stream into portions, comprising a separator having an inlet and an outlet, being traversable within by said fluid stream containing said suspended materials from said inlet to said outlet, means for electrostatically separating from said fluid stream into different portions particles having respectively different dielectric constants; said means comprising a suitably electrically connected multiple series of electrostatically charged plate electrodes located within said separator adjacent the path of said fluid stream, the electrodes of the different series being spaced and held at different electrical potentials of predetermined different intensities.

20. In combination, in an apparatus for electrostatically separating mixtures of finely divided materials suspended in a fluid stream into portions, the particles of the different portions having respectively different dielectric constants, comprising a separator having an inlet and an outlet, being traversable within from said inlet to said outlet by said fluid stream, means for electrostatically diverting dielectrics from said fluid stream comprising a series of electrostatically charged, spaced plate electrodes located within said separator adjacent the path of said fluid stream, and means for causing a secondary fluid stream to pass between said electrodes.

21. In the process of separating particular constituents from mixtures of finely divided materials by electrostatically diverting initially electrically uncharged dielectrics from suspension in a fluid stream, substantially in the absence of electric discharge, into separate channels, by the attractive force of an electrostatic field created by electrically charged electrodes, the step consisting in introducing into said suspension in said fluid stream a gaseous medium having the property of condensing upon the different particles to a different degree and extent, for the purpose of altering the relative intensity of the different diverting forces acting upon the different dielectrics.

22. In the process of separating particular constituents from mixtures of finely divided materials by electrostatically diverting dielectrics from suspension in a fluid stream, substantially in the absence of electric discharge, into separate channels, by the attractive force of an electrostatic field created by electrically charged electrodes, the step consisting in introducing into said suspension in said fluid stream in a suitable manner a fluid medium having the property of forming a surface coating upon the particles of at least one of the components of said mixture to a different extent than upon the particles of the other components, for the purpose of altering the relative intensity of the different diverting forces acting upon the different dielectrics.

23. In the process of separating subdivided complex mixtures of materials into portions the particles of which have dielectric constants substantially alike in any particular portion but different in the different portions, the steps consisting in, conducting the suitably subdivided mixture suspended in a fluid stream through a non-uniform electrostatic field of force substantially free from electric discharge, diverting those particles of said suspension having the highest dielectric constant into a substantially uniform electrostatic field by the attractive force exerted by said electrostatic field upon initially uncharged dielectrics; and finally passing them through a second non-uniform electrostatic field substantially as described.

24. In the process of separating finely divided complex mixtures of materials into portions the particles of which have dielectric constants substantially alike in any particular portion but different in the different portions, the steps consisting in, conducting the suitably subdivided mixture suspended in a fluid stream through a non-uniform electrostatic field of force, diverting those particles of said suspension having the highest dielectric constant into a substantially uniform electrostatic field of force of greater intensity by the attractive force exerted by said electrostatic field upon dielectrics, and finally through a second non-uniform electrostatic field of force of greater intensity than the first one substantially as described.

25. In the process of separating complex mixtures of materials into components in a suitable separator by diverting the finely divided dielectric particles of the mixture suspended in a fluid stream from its course through a non-uniform electrostatic field into a substantially uniform electrostatic field, the step of withdrawing said diverted particles by the attractive force of a second non-uniform electrostatic field of greater intensity than the first one, from said uniform electrostatic field into a fluid stream suitable for conducting said diverted particles out of said separator.

26. In the process of separating finely subdivided mixtures of materials electrostatically into portions having different dielectric constants the steps consisting in, electrostatically diverting substantially those particles of the suitably subdivided mixture having higher dielectric constants than other particles of said mixture, from a moving suspension of said subdivided mixture in a fluid stream, into a substantially uniform electrostatic field of force, and simultaneously conducting a fluid stream through said field of force substantially counter to the path of said diverted particles in said electrostatic field.

27. In the process of separating finely divided mixtures of materials electrostatically into portions having different dielectric constants, the steps consisting in, electrostatically diverting dielectric particles having different dielectric constants, from a suitable suspension of said finely divided mixture in a fluid stream moving through a non-uniform electrostatic field of force, into electrostatic fields of force of different intensities but of greater intensity than the said non-uniform field of force, in substantially the decreasing order of the respective dielectric constants of said different dielectric particles and in the increasing order of the intensity of said different electrostatic fields of force, substantially as described.

28. In the process of separating mixtures of finely divided materials electrostatically into portions having different dielectric constants by electrostatically diverting the dielectric particles of said mixture, when suspended in a fluid stream, from said fluid stream into and through an electrostatic field of force existing between electrically charged electrodes, the step consisting in passing a gaseous stream at a predetermined velocity between said electrodes in a direction substantially counter to the path of said dielectric particles simultaneous with the passage of said dielectric particles between said electrodes, for the purpose of increasing the sharpness of said electrostatic separation.

29. An apparatus for electrically separating complex mixtures of finely divided materials having different dielectric constants into portions having different dielectric constants consisting in, a chamber containing suitably spaced electrodes insulated from one another and having means for maintaining a suitable electrostatic field between and adjacent to said electrodes, said chamber having an inlet and an outlet and traversable by a fluid stream from said inlet to said outlet, and having means for introducing through said inlet a suspension of said mixture in a suitable fluid stream adjacent said electrodes in the non-uniform portion of the electrostatic field of force, means for diverting dielectric particles from said suspension into and through the space between said electrodes, means for collecting the diverted particles in separate portions with suitable means for removing the separately collected portions, means for discharging said fluid stream with the undiverted suspended particles through said outlet and means for collecting and discharging said undiverted particles substantially as described.

30. An apparatus for electrostatically separating complex mixtures of finely divided materials having different dielectric constants into portions having different dielectric constants consisting in, a chamber containing suitably spaced, electrified, plate electrodes and having means for producing a suitable electrostatic field of force between and adjacent to said electrodes, said chamber having an inlet and an outlet and traversable by a fluid stream from said inlet to said outlet, and having means for introducing through said inlet a suspension of said mixture in a suitable fluid stream adjacent said electrodes in the non-uniform portion of the electrostatic field of force, means for diverting dielectric particles from said suspension into and through the space between said electrodes, means for introducing a wetting fluid into said suspension, means for collecting and removing the diverted particles in separate portions with suitable means for removing the separately collected portions, means for discharging said fluid stream with the undiverted suspended particles through said outlet, and means for collecting and discharging said undiverted particles substantially as described.

31. An apparatus for separating subdivided mixtures of materials substantially into their constituents when suspended in a fluid stream by the aid of electrostatic fields of force, consisting in a separating chamber, having an inlet and an outlet and traversable by a fluid stream from said inlet to said outlet, and having means of introducing therein said subdivided mixture of materials suspended in a fluid stream, a multiplicity of electrified electrodes suitably connected to a suitable source of electrical potential substantially forming walls of a channel between said inlet and said outlet and creating therein a non-uniform electrostatic field of force, said electrodes being spaced to form a multiplicity of passages in which more uniform and more intense electrostatic fields of force are suitably maintained and through which dielectric particles can be diverted from said fluid stream in said channel by virtue of said intense electrostatic fields of force, with means for removing said diverted particles from said intense fields of force, and a settling chamber for said diverted particles having means for discharging the settled particles; whereby particles may be preferentially withdrawn from suspension in a fluid stream according to the differences between their specific inductive capacities, and separated.

32. In an apparatus for electrostatically separating finely subdivided mixtures of materials into components according to, and substantially in the order of, their respective dielectric constants, in combination, a separating chamber having an inlet and an outlet and traversable by a fluid stream from said inlet to said outlet; a series of spaced, electrified electrodes coacting with the walls of said chamber to form a channel between said inlet and said outlet for the passage of said fluid stream, said electrodes being so electrified as to produce simultaneously a non-uniform electrostatic field of force in said channel and a more uniform field in the spaces between said electrodes, said electrodes being spaced to form passages between them in the more uniform electrostatic field into which dielectric particles can be electrostatically diverted; and a collecting chamber for collecting the electrostatically separated particles, the series of electrodes being substantially between said channel and said collecting chamber.

33. In an apparatus for separating finely divided mixtures of materials into components by the attractive force of an electrostatic field and comprising a suitably connected separator chamber having, an inlet and an outlet and traversable by a fluid stream from said inlet to said outlet and having spaced electrodes suitably electrically connected for simultaneously creating a non-uniform electrostatic field in said fluid stream and a more uniform electrostatic field in said spaces between the electrodes, means for diverting dielectric particles from a subdivided mixture of materials when suspended in said fluid stream through said spaces, and means for collecting and discharging the diverted material; a means of regulating the sharpness of separation of said materials consisting in a connected secondary fluid supply line suitably connected to said separator chamber for the introduction of a secondary fluid into said electrode-spaces counter to the path of said diverted particles at a controlled velocity substantially as described.

34. In an apparatus for the electrostatic separation of mixed materials into components of different composition and different dielectric constants by forcing the materials in a state of subdivision suspended in a fluid stream through a non-uniform electrostatic field substantially free from electric discharge, in combination, a separating chamber provided with inlet and outlet ports and traversable by a fluid stream from said inlet port to said outlet port; a series of electrodes suitably spaced, having smooth surfaces and suitably connected to a source of electrical energy for producing said electrostatic field, located substantially below said fluid stream; and a collecting chamber located substantially below said series of electrodes for the collection of those components only which pass through the spaces between the electrodes, with means for recovering said collected particles substantially as described.

35. In a suitably connected apparatus for the electrostatic separation of mixed materials into components differing one from the other in their respective dielectric constants by forcing said materials in a state of subdivision and in suspension in a fluid stream through an electrostatic field of force, in combination, a series of spaced electrodes suitably electrified to maintain adjacent thereto a non-uniform electrostatic field substantially free from electric discharge, said apparatus having an inlet and an outlet and traversable by said fluid stream from said inlet to said outlet adjacent said electrodes; a collecting chamber provided with means for collecting and removing those components only which are electrostatically diverted from said fluid stream through the spaces between said electrodes, said electrodes being spaced at a predetermined distance apart leaving a multiplicity of channels in said series through which said diverted particles may pass substantially as described.

36. An apparatus for the electrostatic separation of subdivided mixtures of materials into their components by passing a mixture in a state of subdivision suspended in a fluid stream through an electrostatic field substantially free from electric discharge, consisting in, a separator shell provided with inlet and outlet ports and traversable from said inlet port to said outlet port by said fluid stream; with a multiple series of spaced electrodes within located between said inlet and said outlet adjacent the path of said fluid stream; each series being suitably electrified by connections with a suitable source of electrical energy for the attraction of dielectric particles having particular dielectric constants from said fluid stream into the spaces between the electrodes, said electrodes being spaced and electrified in such a manner that the field between them is substantially free from electric discharge; and a series of collecting chambers, one located below each series of electrodes, for the collection of those particles of the mixture which are diverted by the influence of the corresponding non-uniform electrostatic fields surrounding corresponding series of electrodes, each chamber being provided with a suitable means for removing the collected particles substantially as described.

37. The process of separating finely divided mixtures of materials into portions having different dielectric constants, consisting in, conducting a suitable suspension of a mixture in a suitable fluid stream through a non-uniform electrostatic field of force in a fluid-channel adjacent the homologous edges of a series of electrically charged, spaced plate electrodes; conducting a second fluid stream through a fluid-channel adjacent the opposite edges of said electrodes; diverting dielectric particles having particular dielectric constants from said suspension into the spaces between said electrodes by the aid of the attracting force of an electrostatic field for dielectrics; conducting the diverted particles into the second fluid stream and thence into a suitable separating chamber; controlling the relative pressures in the two fluid streams and causing a predetermined quantity of fluid to pass between the electrodes from the second fluid stream into the first fluid stream; controlling the nature and intensity of the electric charge on said electrodes; and conducting the stream of mixed fluids into another separating chamber and removing in a suitable manner, the remaining suspended particles substantially as described.

38. The process of separating finely divided mixtures of materials into portions having different dielectric constants, consisting in, conducting a suitable suspension of a mixture in a suitable fluid stream through a non-uniform electrostatic field of force in a fluid-channel adjacent the homologous edges of a series of electrically charged, spaced plate electrodes; conducting a second fluid stream through a fluid-channel adjacent the opposite edges of said electrodes; diverting dielectric particles having particular dielectric constants from said suspension into the spaces between said electrodes by the aid of the attracting force of an electrostatic field for dielectrics; conducting the diverted particles into the second fluid stream and thence into a suitable separating chamber; controlling the relative pressures in the two fluid streams and causing a predetermined quantity of the fluid to pass between the electrodes from the first fluid stream into the second fluid stream; controlling the nature and intensity of the electric charge on said electrodes; and conducting the stream containing the undiverted particles in suspension into another separating chamber and removing, in a suitable manner, the remaining suspended particles substantially as described.

39. An apparatus adapted for separating initially uncharged, finely divided, dielectric particles from a fluid stream containing said particles suspended therein, by the aid of the attractive force of an electrostatic field substantially free from electric discharge for dielectrics, comprising a separator having an inlet and an outlet, traversable within from said inlet to said outlet by said fluid stream, having a multiple series of smooth, spaced, plate electrodes located therein having their homologous edges adjacent the path of said fluid stream, being connected to a source of electrical energy adapted to maintain a uniform electrostatic field substantially free from electric discharge between them and simultaneously a non-uniform electrostatic field adjacent to them in the path of said fluid stream.

40. An apparatus adapted for separating initially uncharged, finely divided, dielectric particles from a fluid stream containing said particles suspended therein, by the aid of the attractive force of an electrostatic field substantially free from electric discharge for dielectrics, comprising a separator having an inlet and an outlet, traversable within from said inlet to said outlet by said fluid stream, having a multiplicity of spaced primary electrodes located therein adjacent the path of said fluid stream, being connected with a source of electrical energy adapted to simultaneously produce a substantially uniform electrostatic field between said electrodes and a non-uniform electrostatic field adjacent them substantially free from electric discharge, and a multiplicity of secondary electrodes spaced from one another and from said primary electrodes, and connected to a source of electrical energy adapted for withdrawing electrostatically the separated particles from the field of said primary electrodes.

PERCY HOKE ROYSTER.
WILLIAM W. ODELL.